(12) United States Patent
Leinbach

(10) Patent No.: US 11,554,906 B2
(45) Date of Patent: Jan. 17, 2023

(54) WRAPPER FOR FOODSTUFFS

(71) Applicant: Amy Lisa Gross Leinbach, Huntington Beach, CA (US)

(72) Inventor: Amy Lisa Gross Leinbach, Huntington Beach, CA (US)

(*) Notice: Subject to any disclaimer, the term of this patent is extended or adjusted under 35 U.S.C. 154(b) by 185 days.

(21) Appl. No.: 17/080,735

(22) Filed: Oct. 26, 2020

(65) Prior Publication Data

US 2021/0122544 A1 Apr. 29, 2021

Related U.S. Application Data

(60) Provisional application No. 62/925,355, filed on Oct. 24, 2019.

(51) Int. Cl.
| | |
|---|---|
| *B65D 65/40* | (2006.01) |
| *B32B 7/12* | (2006.01) |
| *B32B 3/26* | (2006.01) |
| *B32B 15/20* | (2006.01) |
| *B32B 25/20* | (2006.01) |
| *B65D 43/02* | (2006.01) |

(Continued)

(52) U.S. Cl.
CPC .............. *B65D 65/40* (2013.01); *B32B 3/266* (2013.01); *B32B 7/12* (2013.01); *B32B 15/06* (2013.01); *B32B 15/20* (2013.01); *B32B 25/20* (2013.01); *B65D 43/0202* (2013.01); *B65D 77/2024* (2013.01); *B32B 2250/03* (2013.01); *B32B 2250/40* (2013.01); *B32B 2307/206* (2013.01); *B32B 2307/308* (2013.01); *B32B 2307/412* (2013.01); *B32B 2307/73* (2013.01); *B32B 2435/02* (2013.01); *B65D 2543/00092* (2013.01); *B65D 2543/00194* (2013.01); *B65D 2543/00203* (2013.01); *B65D 2543/00277* (2013.01); *B65D 2543/00296* (2013.01); *B65D 2543/00314* (2013.01)

(58) Field of Classification Search
CPC .. B65D 65/406; B65D 65/40; B65D 43/0202; B65D 55/066; B65D 77/2024; B32B 3/266; B32B 15/06; B32B 15/20; B32B 25/20
USPC ............ 220/377, 359.5, 359.4, 359.3, 359.1; 428/447
See application file for complete search history.

(56) References Cited

U.S. PATENT DOCUMENTS

| | | | | |
|---|---|---|---|---|
| 3,301,464 A | * | 1/1967 | Amberg | B65D 51/20 229/125.17 |
| 4,171,084 A | * | 10/1979 | Smith | B29C 65/368 229/5.5 |

(Continued)

FOREIGN PATENT DOCUMENTS

| | | | | |
|---|---|---|---|---|
| CA | 2791785 A1 | * | 9/2011 | ............. B32B 15/04 |
| EP | 0111900 A2 | * | 6/1984 | ........... B65D 55/026 |

(Continued)

*Primary Examiner* — Robert J Hicks
(74) *Attorney, Agent, or Firm* — Kunzler Bean & Adamson

(57) ABSTRACT

Apparatuses, systems, and methods are presented for a wrapper for foodstuffs. An elastomeric layer is flexible and substantially planar. A metallic layer is malleable and substantially planar. An adhesive couples the metallic layer to at least a perimeter of the elastomeric layer so that the elastomeric layer, the metallic layer, and the adhesive comprise a food covering for a container and the metallic layer is configured to conform around an edge of the container.

20 Claims, 5 Drawing Sheets

(51) Int. Cl.
*B32B 15/06* (2006.01)
*B65D 77/20* (2006.01)

(56) References Cited

U.S. PATENT DOCUMENTS

| | | | | |
|---|---|---|---|---|
| 4,579,240 | A * | 4/1986 | Ou-Yang | B65D 55/066 215/230 |
| 4,693,390 | A * | 9/1987 | Hekal | B65D 77/2056 229/125.17 |
| 4,757,914 | A * | 7/1988 | Roth | B32B 15/085 220/359.3 |
| 8,672,168 | B2 * | 3/2014 | Triquet | B65D 51/20 220/359.3 |
| 2011/0089177 | A1 * | 4/2011 | Thorstensen-Woll | B65D 51/20 220/359.4 |
| 2014/0240869 | A1 * | 8/2014 | Furuta | B32B 27/308 360/110 |
| 2019/0344947 | A1 * | 11/2019 | Chen | B65D 77/2024 |

FOREIGN PATENT DOCUMENTS

| | | | | |
|---|---|---|---|---|
| EP | 1445209 | A1 * | 8/2004 | B32B 15/046 |
| WO | WO-02068275 | A2 * | 9/2002 | B65D 43/0212 |

* cited by examiner

WRAPPER FOR FOODSTUFFS

CROSS-REFERENCES TO RELATED APPLICATIONS

This application claims the benefit of U.S. Provisional Patent Application No. 62/925,355 entitled "WRAPPER FOR FOODSTUFFS" and filed on Oct. 24, 2019 for Amy Lisa Gross Leinbach, which is incorporated herein by reference in its entirety for all purposes.

TECHNICAL FIELD

This disclosure relates to food wrappers and more particularly relates to a hybrid food wrapper comprising multiple materials.

BACKGROUND

Securely wrapping food on a plate or other container can pose several problems. For example, plastic wrap can be difficult to handle and often does not secure around the edge of the container. Plastic wrap can also be difficult to reuse. Aluminum foil can be better at wrapping around the edge of the container securely, but can have limited reuses and can easily rip or tear.

SUMMARY

Apparatuses are presented for a wrapper for foodstuffs. In one embodiment, an elastomeric layer is flexible and substantially planar. A metallic layer, in certain embodiments, is malleable and substantially planar. In some embodiments, an adhesive couples the metallic layer to at least a perimeter of the elastomeric layer so that the elastomeric layer, the metallic layer, and the adhesive comprise a food covering for a container and the metallic layer is configured to conform around an edge of the container.

In certain embodiments, a second elastomeric layer is disposed on an opposite side of the metallic layer from the elastomeric layer so that the elastomeric layer and the second elastomeric layer enclose the metallic layer. An aperture, in some embodiments, is disposed in the metallic layer, so that the metallic layer is disposed toward the perimeter of the elastomeric layer. In some embodiments, at least a portion of the elastomeric layer is transparent so that the aperture in the metallic layer forms a transparent window in the food covering.

In one embodiment, the elastomeric layer comprises an inert, biocompatible, hypoallergenic, thermally stable, water repellant, electrically insulative, and/or polymeric material. The elastomeric layer, in certain embodiments, comprises a silicone material. In some embodiments, the metallic layer comprises aluminum.

Other apparatuses for a wrapper for foodstuffs are presented. In one embodiment, an apparatus includes means for a flexible, substantially planar, elastomeric layer. An apparatus, in a further embodiment, includes means for a malleable, substantially planar, metallic layer. In some embodiments, an apparatus includes means for coupling the means for the malleable, substantially planar, metallic layer to at least a perimeter of the means for the flexible, substantially planar, elastomeric layer to form a food covering for a container so that the means for the malleable, substantially planar, metallic layer comprises means for conforming around an edge of the container.

Systems are presented for a wrapper for foodstuffs. In one embodiment, a system includes a pack of multiple food coverings for different sized containers. The multiple food coverings, in some embodiments, have different sizes corresponding to the different sized containers.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided for a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
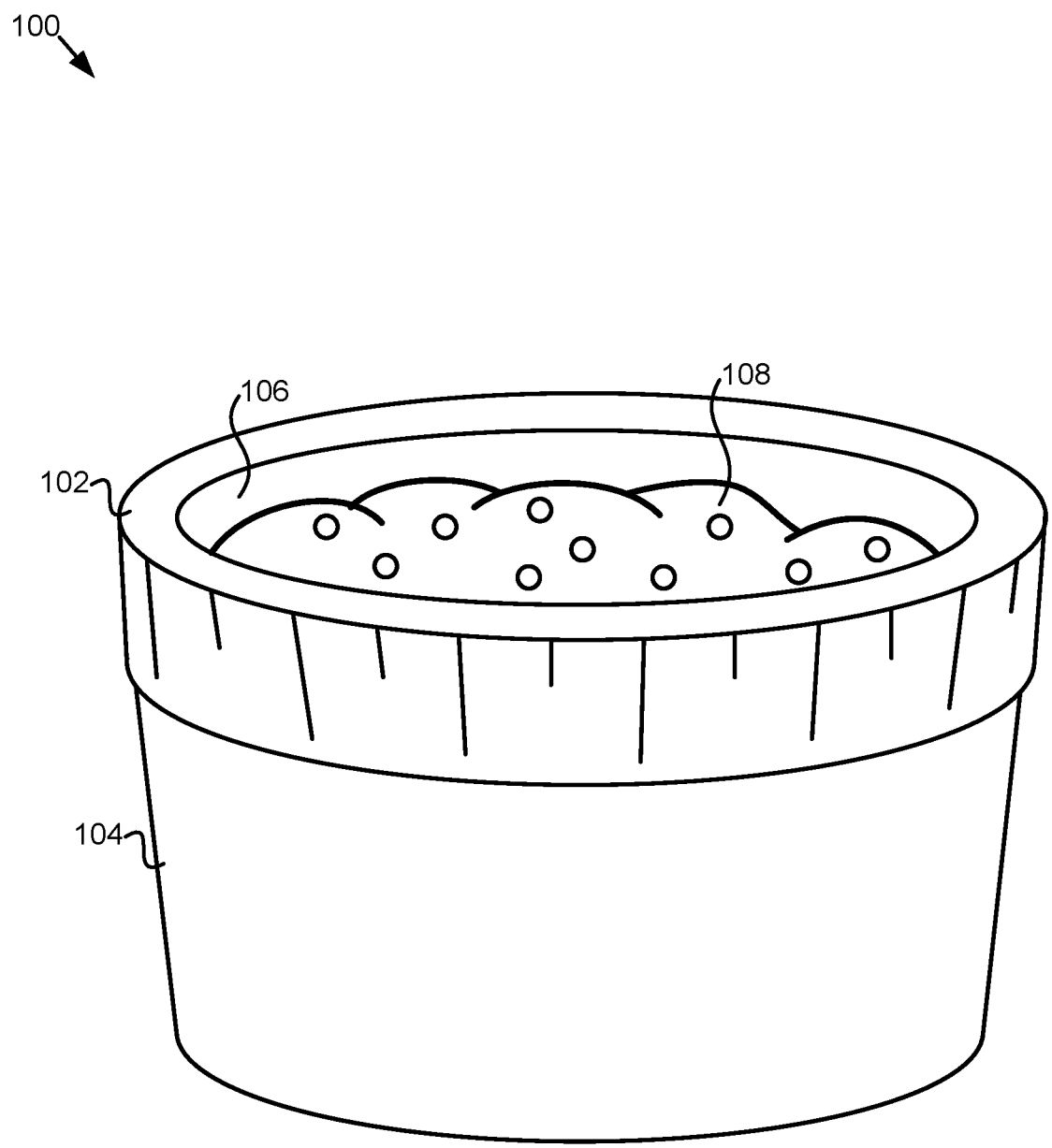
FIG. 1 is a perspective view illustrating one embodiment of a system for a food covering for a container.

FIG. 1 depicts one embodiment of a system 100 for a food covering 102 for a container 104 of food 108 or other perishable material. In the depicted embodiment, the food covering 102 includes a transparent window 106 through which the food 108 is visible.

In one embodiment, the food covering 102 includes both one or more elastomeric layers and at least one metallic layer. For example, the one or more elastomeric layers may be flexible and substantially planar, and may protect the at least one metallic layer (e.g., from water damage, from corrosion, from creasing, from ripping, from tearing, from contact with food 108, or the like) while the at least one metallic layer may be malleable and substantially planar to conform around an edge of the container 104, keeping the food 108 fresh, protected, or the like.

The combination of one or more elastomeric layers and at least one metallic layer, in certain embodiments, may be durable, minimizing ripping, tearing, cracking, creasing, breakdown, or the like, such that the food covering 102 is washable and/or reusable (e.g., reducing usage of disposable food coverings, or the like). By forming and/or molding around an edge of the container 104 in a malleable manner, in some embodiments, the food covering 102 may substantially seal the container 104 without requiring stretching and/or clinging of the food covering 102.

The one or more elastomeric layers, in one embodiment, comprise a sturdy and/or durable material that is flexible (e.g., capable of being deformed and/or bent), elastomeric (e.g., a material with viscosity, elasticity, and/or viscoelasticity), or the like. In certain embodiments, the one or more elastomeric layers may comprise an inert, biocompatible, hypoallergenic, thermally stable, water repellant, electrically insulative, polymeric material, such as a silicone material or the like. In various embodiments, the one or more elastomeric layers may comprise one or more of a polymer, silicone, rubber, polyisoprene (e.g., natural or synthetic rubber), polybutadiene, chloroprene, butyl rubber, styrene-butadiene rubber, nitrile rubber, ethylene propylene rubber, epichlorohydrin rubber, polyacrylic rubber, fluorosilicone rubber, fluoroelastomer, perfluoroelastomer, polyether block amide, chlorosulfonated polyethylene, ethylene-vinyl acetate, thermoplastic elastomer, resilin protein, elastin protein, polysulfide rubber, elastolefin, and/or another material.

The at least one metallic layer, in certain embodiments, is malleable (e.g., able to deform under compressive stress without fracture), ductile (e.g., able to undergo plastic deformation without rupture or breaking), or the like. In some embodiments, the at least one metallic layer may comprise a foil, a metallic sheet, or the like of a metal such as aluminum, copper, tin, brass, nickel, or the like. The at least one metallic layer, in one embodiment, may be thicker than single use foil (e.g., at least about 0.0015 inches thick, at least about 0.0020 inches thick, at least about 0.0024 inches thick, at least about 0.0048 inches thick, at least about 0.0064 inches thick, or more).

An adhesive may couple the at least one metallic layer to at least a perimeter of the one or more elastomeric layers to form the food covering 102 for the container 104. In various embodiments, an adhesive may comprise one or more of a weld, a solvent based acrylic adhesive, an emulsion based acrylic adhesive, a rubber based adhesive, a silicone based adhesive, or the like. In one embodiment, an adhesive may comprise a substantially one hundred percent silicone adhesive.

In the depicted embodiment, the food covering 102 includes a transparent window 106. In other embodiments, the food covering 102 is substantially continuous, without a transparent window 106 or the like. The transparent window 106, in some embodiments, is substantially transparent/translucent and part of and/or coupled to one or more elastomeric layers over an aperture or other opening within at least one metallic layer (e.g., so that the at least one metallic layer is disposed toward a perimeter of the one or more elastomeric layers to conform to an edge of the container 104).

The container 104, in various embodiments, may comprise a bowl, a plate, a cup, a bucket, a basket, a pot, a pan, a can, a box, and/or another type of container 104. In certain embodiments, a system 100 may comprise a pack and/or set of multiple food coverings 102 having different sizes for use with containers 104 of different shapes and/or sizes (e.g., a set of two, a set of three, a set of four, a set of five, a set of six, a set of seven, a set of eight, a set of nine, a set of ten, a set of twelve, a set of sixteen, a set of eighteen, a set of twenty, a set of twenty-four, or the like). While the depicted food covering 102 is substantially circular, in other embodiments, a food covering may have a substantially square shape, a substantially rectangular shape, or another shape. A pack and/or set of multiple food coverings 102 may include food coverings 102 with different shapes and/or different sizes.

Figure 2:
FIG. 2 is a side view illustrating one embodiment of a food covering for a container.

FIG. 2 depicts one embodiment of a food covering 102 for a container 104. The food covering 102 of FIG. 2, in certain embodiments, may be substantially similar to the food covering 102 described above with regard to FIG. 1. In the depicted embodiment, the food covering 102 comprises an elastomeric layer 202, a metallic layer 204, and an adhesive 206.

In one embodiment, the elastomeric layer 202 is parallel and adjacent to the metallic layer 204 and is bonded or otherwise coupled to the metallic layer 204 by the adhesive 206. The elastomeric layer 202 and the metallic layer 204, in the depicted embodiment, are substantially planar, and are continuous (e.g., without an aperture, a transparent window, or the like).

Figure 3:
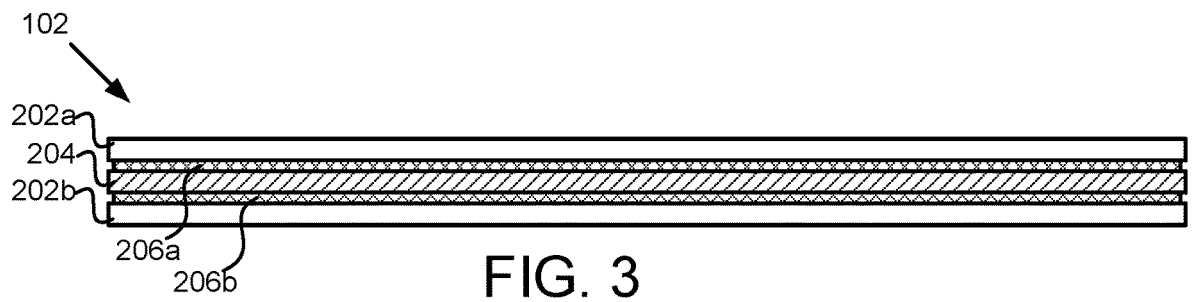
FIG. 3 is a side view illustrating a further embodiment of a food covering for a container.

FIG. 3 depicts a further embodiment of a food covering 102 for a container 104. The food covering 102 of FIG. 3, in certain embodiments, may be substantially similar to one or more of the food coverings 102 described above with regard to FIG. 1 through FIG. 2. In the depicted embodiment, the food covering 102 comprises a first elastomeric layer 202a, a metallic layer 204, a second elastomeric layer 202b, and an adhesive 206a-b.

The metallic layer 204, in the depicted embodiment, is sandwiched between the two elastomeric layers 202a-b, with the first elastomeric layer 202a on one side of the metallic layer 204 and the second elastomeric layer 202b on an opposite side of the metallic layer 204. In certain embodiments, the first and second elastomeric layers 202a-b substantially enclose the metallic layer 204. For example, the first and second elastomeric layers 202a-b may protect the metallic layer 204 (e.g., from water damage, from corrosion, from creasing, from ripping, from tearing, from contact with food 108, or the like).

In some embodiments, a first adhesive layer 206a is disposed between the first elastomeric layer 202a and the metallic layer 204 and a second adhesive layer 206b is disposed between the metallic layer 204 and the second elastomeric layer 202b. The first and second adhesive layers 206a-b, in various embodiments, may comprise the same type of adhesive, different types of adhesive, or the like.

Figure 4:
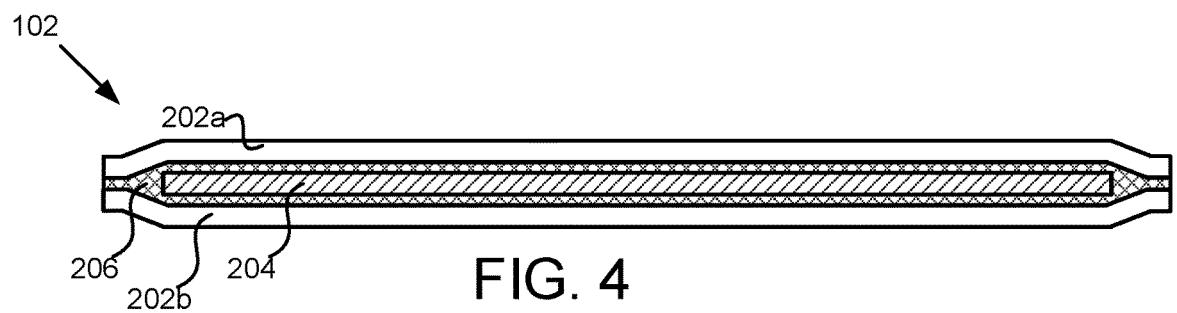
FIG. 4 is a side view illustrating another embodiment of a food covering for a container.

FIG. 4 depicts another embodiment of a food covering 102 for a container 104. The food covering 102 of FIG. 4, in certain embodiments, may be substantially similar to one or more of the food coverings 102 described above with regard to FIG. 1 through FIG. 3. In the depicted embodiment, the food covering 102 comprises a first elastomeric layer 202a, a metallic layer 204, a second elastomeric layer 202b, and an adhesive 206.

In some embodiments, the metallic layer 204 may be visible and/or exposed along a perimeter, edge, side, end, or the like of the food covering 102 (e.g., between the elastomeric layers 202a-b). In the depicted embodiment, perimeters, edges, sides, ends, or the like of first and second elastomeric layers 202a-b are sealed (e.g., by the adhesive 206 or the like), crimped, closed, or the like around the metallic layer 204 (e.g., to more fully protect the metallic layer 204 from water damage, from corrosion, from creasing, from ripping, from tearing, from contact with food 108, or the like). The perimeters, edges, sides, ends, or the like of the first and second elastomeric layers 202a-b may be sealed, crimped, closed, or the like by the adhesive 206, by a weld (e.g., using heat and/or pressure), by an injection molding and/or dipping process (e.g., being integrally formed around the metallic layer 204), or the like.

Figure 5:
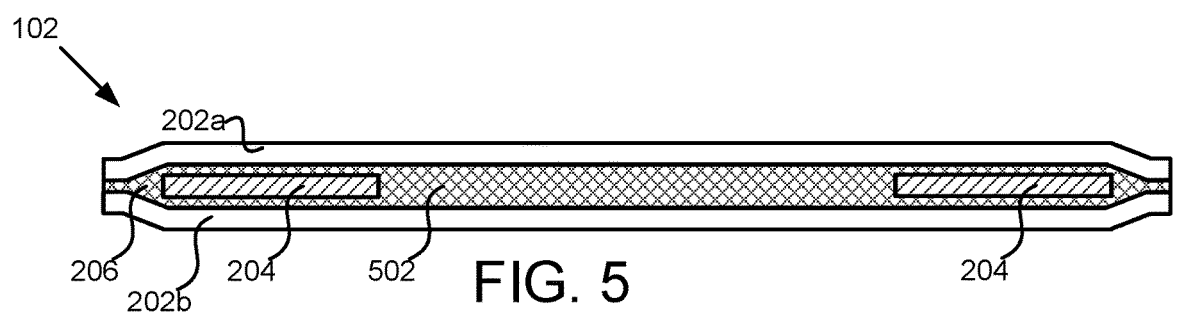
FIG. 5 is a side view illustrating a certain embodiment of a food covering for a container.

FIG. 5 depicts a certain embodiment of a food covering 102 for a container 104. The food covering 102 of FIG. 5, in certain embodiments, may be substantially similar to one or more of the food coverings 102 described above with regard to FIG. 1 through FIG. 4. In the depicted embodiment, the food covering 102 comprises a first elastomeric layer 202a, a metallic layer 204, a second elastomeric layer 202b, and an adhesive 206.

The metallic layer 204, in the depicted embodiment, comprises an aperture 502, hole 502, and/or other opening 502. The aperture 502 is disposed toward a center and/or middle of the metallic layer 204, so that the metallic layer 204 is disposed at or toward a perimeter of the elastomeric layers 202a-b and/or the food covering 102. With the metallic layer 204 disposed at least along a perimeter of the one or more elastomeric layers 202a-b, the metallic layer 204 may enable the food covering 102 to conform around an edge of a container 104 (e.g., to at least partially seal the container 104, to protect food 108 within the container 104, or the like).

In some embodiments, at least a portion of the one or more elastomeric layers 202a-b and/or the adhesive 206 may be transparent so that the aperture 502 forms a transparent window 502 (e.g., through which food 108, an interior of the container 104, or the like may be visible without removing the food covering 102 from the container 104).

Figure 6:
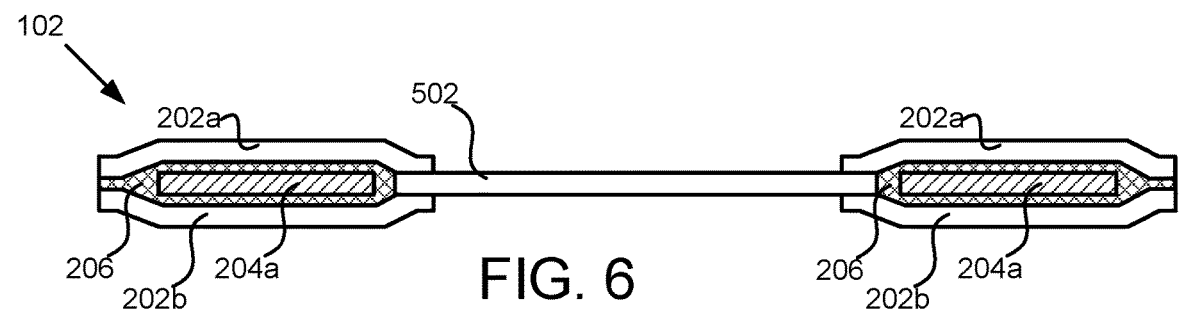
FIG. 6 is a side view illustrating a further embodiment of a food covering for a container.

FIG. 6 depicts a further embodiment of a food covering 102 for a container 104. The food covering 102 of FIG. 6, in certain embodiments, may be substantially similar to one or more of the food coverings 102 described above with regard to FIG. 1 through FIG. 5. In the depicted embodiment, the food covering 102 comprises a first elastomeric layer 202a, a metallic layer 204, a second elastomeric layer 202b, and an adhesive 206.

In the depicted embodiment, the metallic layer 204 and the one or more elastomeric layers 202a-b each comprise an aperture 502, with different layer 502 of material disposed within the aperture 502 (e.g., as an extension and/or portion of an elastomeric layer 202a-b, or the like). In certain embodiments, the different material 502 disposed within the aperture 502 comprises a transparent material that forms a transparent window 502.

The perimeters, edges, sides, ends, or the like of the different layer 502 of material may be coupled to (e.g., between) one or more elastomeric layers 202a-b by being sealed, crimped, adhered (e.g., by adhesive 206), welded, pressed, or the like to a first and/or second elastomeric layers 202a-b, or the like.

Figure 7:
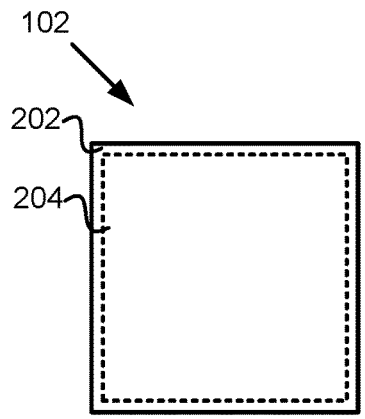
FIG. 7 is a top view illustrating one embodiment of a food covering for a container.

FIG. 7 depicts one embodiment of a food covering 102 for a container 104. The food covering 102 of FIG. 7, in certain embodiments, may be substantially similar to one or more of the food coverings 102 described above with regard to FIG. 1 through FIG. 6. In the depicted embodiment, the food covering 102 comprises one or more elastomeric layers 202 and a metallic layer 204, without an aperture 502. The food covering 102, the one or more elastomeric layers 202, and the metallic layer 204, in the depicted embodiment, are substantially square shaped (e.g., for use with square shaped containers 104 or the like).

Figure 8:
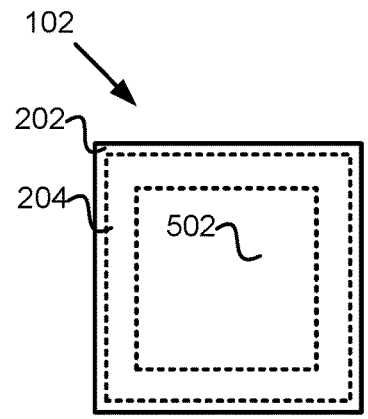
FIG. 8 is a top view illustrating a certain embodiment of a food covering for a container.

FIG. 8 depicts a certain embodiment of a food covering 102 for a container 104. The food covering 102 of FIG. 8, in certain embodiments, may be substantially similar to one or more of the food coverings 102 described above with regard to FIG. 1 through FIG. 7. In the depicted embodiment, the food covering 102 comprises one or more elastomeric layers 202 and a metallic layer 204, with an aperture 502 disposed in at least the metallic layer 204. The food covering 102, the one or more elastomeric layers 202, the metallic layer 204, and the aperture 502, in the depicted embodiment, are substantially square shaped (e.g., for use with square shaped containers 104 or the like).

Figure 9:
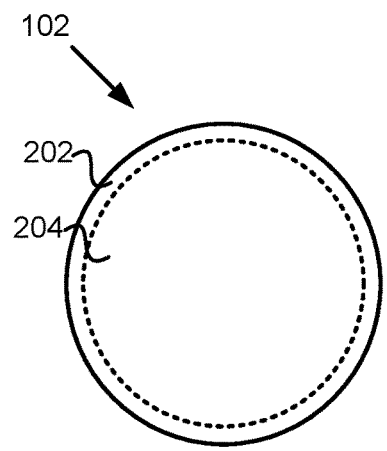
FIG. 9 is a top view illustrating a further embodiment of a food covering for a container.

FIG. 9 depicts a further embodiment of a food covering 102 for a container 104. The food covering 102 of FIG. 9, in certain embodiments, may be substantially similar to one or more of the food coverings 102 described above with regard to FIG. 1 through FIG. 8. In the depicted embodiment, the food covering 102 comprises one or more elastomeric layers 202 and a metallic layer 204, without an aperture 502. The food covering 102, the one or more elastomeric layers 202, and the metallic layer 204, in the depicted embodiment, are substantially circular (e.g., for use with circular shaped containers 104 or the like).

Figure 10:
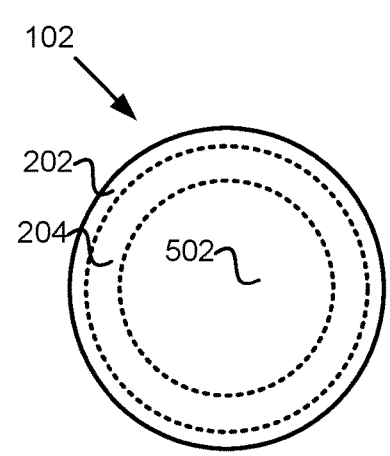
FIG. 10 is a top view illustrating another embodiment of a food covering for a container.

FIG. 10 depicts another embodiment of a food covering 102 for a container 104. The food covering 102 of FIG. 10, in certain embodiments, may be substantially similar to one or more of the food coverings 102 described above with regard to FIG. 1 through FIG. 9. In the depicted embodiment, the food covering 102 comprises one or more elastomeric layers 202 and a metallic layer 204, with an aperture 502 disposed in at least the metallic layer 204. The food covering 102, the one or more elastomeric layers 202, the metallic layer 204, and the aperture 502, in the depicted embodiment, are substantially circular (e.g., for use with circular shaped containers 104 or the like).

Figure 11:
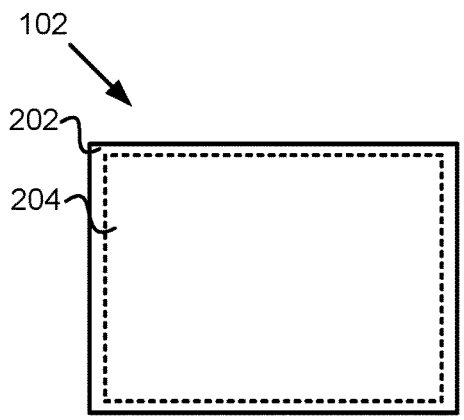
FIG. 11 is a top view illustrating one embodiment of a food covering for a container.

FIG. 11 depicts one embodiment of a food covering 102 for a container 104. The food covering 102 of FIG. 11, in certain embodiments, may be substantially similar to one or more of the food coverings 102 described above with regard to FIG. 1 through FIG. 10. In the depicted embodiment, the food covering 102 comprises one or more elastomeric layers 202 and a metallic layer 204, without an aperture 502. The food covering 102, the one or more elastomeric layers 202, and the metallic layer 204, in the depicted embodiment, are substantially rectangular (e.g., for use with rectangular shaped containers 104 or the like).

Figure 12:
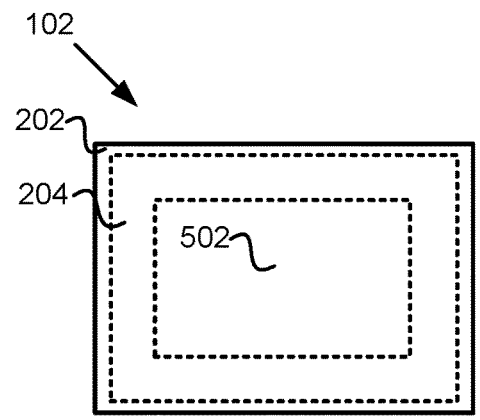
FIG. 12 is a top view illustrating a further embodiment of a food covering for a container.

FIG. 12 depicts a further embodiment of a food covering 102 for a container 104. The food covering 102 of FIG. 12, in certain embodiments, may be substantially similar to one or more of the food coverings 102 described above with regard to FIG. 1 through FIG. 11. In the depicted embodiment, the food covering 102 comprises one or more elastomeric layers 202 and a metallic layer 204, with an aperture 502 disposed in at least the metallic layer 204. The food covering 102, the one or more elastomeric layers 202, the metallic layer 204, and the aperture 502, in the depicted embodiment, are substantially rectangular (e.g., for use with rectangular shaped containers 104 or the like).

Figure 13:
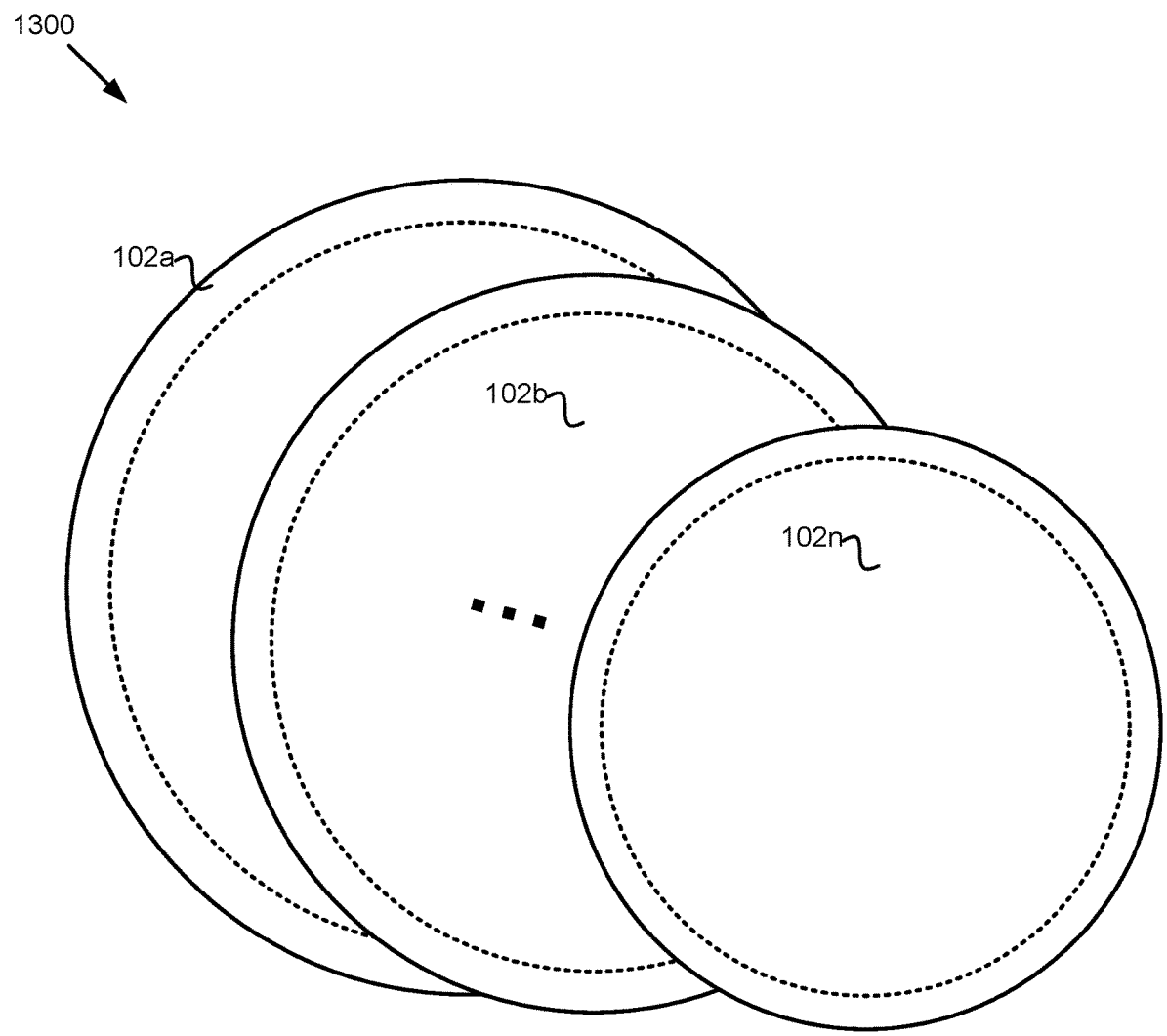
FIG. 13 is a top view illustrating one embodiment of a system for a food covering for a container.

FIG. 13 depicts one embodiment of a system 1300 for a food covering 102 for a container 104. The food coverings 102a-n of FIG. 13, in certain embodiments, may be substantially similar to one or more of the food coverings 102 described above with regard to FIG. 1 through FIG. 12. In the depicted embodiment, the system 1300 comprises a pack and/or set of multiple food coverings 102a-n having different sizes corresponding to different sized containers. While the multiple food coverings 102a-n, in the depicted embodiment, are substantially circular, in other embodiments, the multiple food coverings 102a-n may comprise a different shape (e.g., a square shape, a rectangular shape, another shape, or the like), may comprise multiple different shapes in the same pack/set, or the like, based on sizes and/or shapes of the intended different containers 104.

Figure 14:
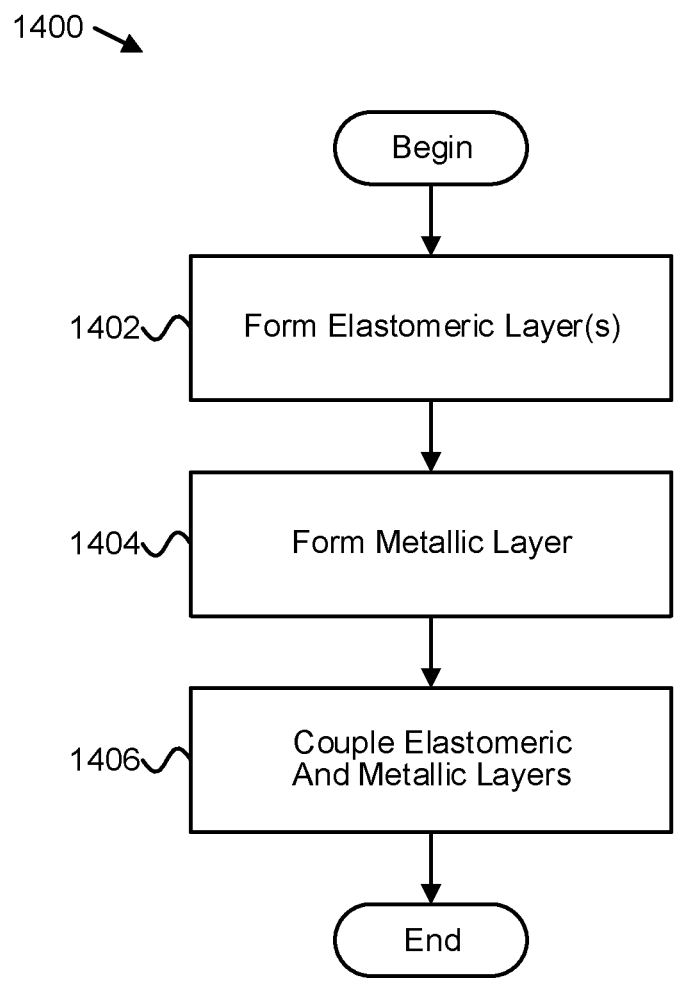
FIG. 14 is a schematic flow chart diagram illustrating one embodiment of a method of manufacturing a food covering for a container.

FIG. 14 depicts one embodiment of a method 1400 of manufacturing a food covering 102 for a container 104. As used herein, a manufacturer may include one or more of a manufacturing hardware machine of other device, a robotic device, a factory device, a hardware and/or software controller for such a device, a user and/or administrator of such a device, or the like.

The method 1400 begins and a manufacturer forms 1402 one or more elastomeric layers 202 (e.g., using a stamp process, an injection molding process, a form/casting process, a cutting process, or the like). A manufacturer forms 1404 a metallic layer 204 (e.g., using a stamp process, a cutting process, a rolling process, or the like). A manufacturer couples 1406 the one or more elastomeric layers 202 to the metallic layer 204, using an adhesive 206 or the like, and the method 1400 ends.

A means for a flexible, substantially planar, elastomeric layer 202, in various embodiments, may include a sheet of material, an inert material, a biocompatible material, a hypoallergenic material, a thermally stable material, a water repellant material, an electrically insulative material, a polymeric material, a plastic material, a rubber material, a silicone material, an at least partially transparent material, and/or another flexible, substantially planar, elastomeric layer 202. Other embodiments may include similar or equivalent means for a flexible, substantially planar, elastomeric layer 202.

A means for a malleable, substantially planar, metallic layer 204, in various embodiments, may include a foil material, an aluminum material, a copper material, a tin material, a brass material, a nickel material, a metallic alloy, a metallic sheet, and/or another metallic layer. Other embodiments may include similar or equivalent means for a malleable, substantially planar, metallic layer 204.

A means for coupling a metallic layer 204 to at least a perimeter of an elastomeric layer 202 to form a food covering 102 for a container 104, in various embodiments, may include a weld, a solvent based acrylic adhesive 206, an emulsion based acrylic adhesive 206, a rubber based adhesive 206, a silicone based adhesive 206, and/or another adhesive 206. Other embodiments may include similar or equivalent means for coupling a metallic layer 204 to at least a perimeter of an elastomeric layer 202 to form a food covering 102 for a container 104.

A means for conforming around an edge of a container 104, in various embodiments, may include a metallic layer 204, an elastomeric layer 202, a food covering 102, or the like. Other embodiments may include similar or equivalent means for conforming around an edge of a container 104.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
    an elastomeric layer, the elastomeric layer being flexible and substantially planar;
    a metallic layer, the metallic layer being malleable and substantially planar; and
    an adhesive coupling the metallic layer to at least a perimeter of the elastomeric layer such that the elastomeric layer, the metallic layer, and the adhesive comprise a food covering for a container, the metallic layer configured to conform around an edge of the container.

2. The apparatus of claim 1, further comprising a second elastomeric layer disposed on an opposite side of the metallic layer from the elastomeric layer such that the elastomeric layer and the second elastomeric layer enclose the metallic layer.

3. The apparatus of claim 1, further comprising an aperture in the metallic layer such that the metallic layer is disposed toward the perimeter of the elastomeric layer.

4. The apparatus of claim 3, wherein at least a portion of the elastomeric layer is transparent such that the aperture in the metallic layer forms a transparent window in the food covering.

5. The apparatus of claim 1, wherein the elastomeric layer comprises an inert, biocompatible, hypoallergenic, thermally stable, water repellant, electrically insulative, polymeric material.

6. The apparatus of claim 5, wherein the elastomeric layer comprises a silicone material.

7. The apparatus of claim 1, wherein the metallic layer comprises aluminum.

8. A system comprising:
a pack of multiple food coverings for different sized containers, the multiple food coverings having different sizes corresponding to the different sized containers, each of the multiple food coverings comprising:
an elastomeric layer, the elastomeric layer being flexible and substantially planar;
a metallic layer, the metallic layer being malleable and substantially planar; and
an adhesive coupling the metallic layer to at least a perimeter of the elastomeric layer such that the metallic layer is configured to conform around an edge of at least one container of the different sized containers.

9. The system of claim 8, each of the multiple food coverings further comprising a second elastomeric layer disposed on an opposite side of the metallic layer from the elastomeric layer such that the elastomeric layer and the second elastomeric layer enclose the metallic layer.

10. The system of claim 8, each of the multiple food coverings further comprising an aperture in the metallic layer such that the metallic layer is disposed toward the perimeter of the elastomeric layer.

11. The system of claim 10, wherein at least a portion of the elastomeric layer is transparent such that the aperture in the metallic layer forms a transparent window.

12. The system of claim 8, wherein the elastomeric layer comprises an inert, biocompatible, hypoallergenic, thermally stable, water repellant, electrically insulative, polymeric material.

13. The system of claim 12, wherein the elastomeric layer comprises a silicone material.

14. The system of claim 8, wherein the metallic layer comprises aluminum.

15. A method comprising:
providing a flexible, substantially planar, elastomeric layer;
providing a malleable, substantially planar, metallic layer; and
coupling the malleable, substantially planar, metallic layer to at least a perimeter of the flexible, substantially planar, elastomeric layer to form a food covering for a container, the malleable, substantially planar, metallic layer conforming around an edge of the container.

16. The method of claim 15, further comprising providing a second flexible, substantially planar, elastomeric layer disposed on an opposite side of the malleable, substantially planar, metallic layer thereby enclosing the malleable, substantially planar, metallic layer.

17. The method of claim 15, wherein the malleable, substantially planar, metallic layer comprises an aperture such that the malleable, substantially planar, metallic layer is disposed toward the perimeter of the flexible, substantially planar, elastomeric layer.

18. The method of claim 17, wherein at least a portion of the flexible, substantially planar, elastomeric layer is transparent such that the aperture forms a transparent window in the food covering.

19. The method of claim 15, wherein the flexible, substantially planar, elastomeric layer comprises an inert, biocompatible, hypoallergenic, thermally stable, water repellant, electrically insulative, polymeric material.

20. The method of claim 19, wherein the flexible, substantially planar, elastomeric layer comprises a silicone material.

* * * * *